(12) United States Patent
    Patel

(10) Patent No.: US 9,124,829 B2
(45) Date of Patent: Sep. 1, 2015

(54) OPTICAL BLACK PIXEL READOUT FOR IMAGE SENSOR DATA CORRECTION

(75) Inventor: Gaurang Patel, Newbury Park, CA (US)

(73) Assignee: AltaSens, Inc., Westlake Village, CA (US)

( * ) Notice: Subject to any disclaimer, the term of this patent is extended or adjusted under 35 U.S.C. 154(b) by 617 days.

(21) Appl. No.: 13/558,988

(22) Filed: Jul. 26, 2012

(65) Prior Publication Data

US 2014/0027611 A1    Jan. 30, 2014

(51) Int. Cl.
*H01L 27/00* (2006.01)
*H04N 5/361* (2011.01)
*H04N 5/365* (2011.01)
*H04N 5/378* (2011.01)

(52) U.S. Cl.
CPC ............. *H04N 5/361* (2013.01); *H04N 5/3655* (2013.01); *H04N 5/378* (2013.01)

(58) Field of Classification Search
CPC ..... H04N 5/361; H04N 5/3658; H04N 3/155; H04N 9/045; H01L 27/146
USPC ........ 250/208.1, 214 R, 214.1; 348/241–251; 257/290–292, 440
See application file for complete search history.

(56) References Cited

U.S. PATENT DOCUMENTS

| 7,994,858 B2 | 8/2011 | Standley et al. |
| 8,508,629 B2 * | 8/2013 | Mo et al. ................. 348/245 |
| 2010/0085438 A1 | 4/2010 | Richardson |

* cited by examiner

*Primary Examiner* — Que T Le
(74) *Attorney, Agent, or Firm* — Amin, Turocy & Watson, LLP

(57) ABSTRACT

Providing for analog averaging of optical black pixels of an image sensor is described herein. By way of example, optical black pixel signals can be output by a row of pixels and provided in a parallel manner to a readout circuit. The readout circuit can include an averaging circuit that, when activated, generates an analog average of signals received at the readout circuit. The analog average can be sampled at any suitable signal output of the readout circuit, or multiple samples can be acquired to mitigate temporal noise, improve yield, and so on. By utilizing analog averaging, optical black pixel information can be obtained much more quickly than with digital counterparts, and optical black pixels can be fully utilized, as well as utilized more flexibly, in generating the black pixel output. Further sensor die size can be reduced, by replacing digital adders, dividers or shifters with the averaging circuit.

20 Claims, 10 Drawing Sheets

OPTICAL BLACK PIXEL READOUT FOR IMAGE SENSOR DATA CORRECTION

TECHNICAL FIELD

The subject application relates generally to optical image sensor technology, and more particularly to readout of optical black pixels in conjunction with providing data correction for an image sensor.

BACKGROUND

Optical electronics have become an important part of the consumer electronics industry, arguably one of the fastest growing, rapidly evolving and intriguing industries of modern times. Camera and video equipment have become near ubiquitous in the consumer electronics market, currently being integrated into smart phones, laptop computers, personal digital assistants, and even micro surveillance technologies, as well as employed in dedicated hand-held cameras and video recorders. Much of the successful penetration in the consumer electronics market is due to miniaturization and modularization of optical electronic systems. Camera and video recording equipment, for instance, can be manufactured as modular elements having near plug-n-play capability from the device assembly perspective, not only with respect to mounting a modular element within an electronic device, but with respect to hardware and software interoperability. This plug-n-play capability in conjunction with miniaturization of optics and optical circuits has facilitated very low cost and effective integration of optical components in a wide array of consumer devices.

In addition to the foregoing, advancements in electronics technology in general have reduced the cost of electronic devices and greatly enhanced their technical features and personal utility. This is evident with camera and video recording equipment just as much so with other types of electronic devices. The combination of reduced cost and increased utility generally drives consumer demand upward, and optical electronics has been no exception.

Although advancements in electronics have made great impact over recent decades, a few in particular have specifically facilitated integration of image capture components into consumer electronics. First, improvements in semiconductor technology enable processor and memory chips to become progressively smaller for a given number of transistors. As transistor-based processors and memory have shrunk in size, modularization has become feasible even on the scale of hand-held consumer electronics. Second, miniaturization of optical components including lenses and image sensors has enabled fabrication of these components at a fraction of their volume just a decade ago. While large optical lenses have traditionally been a constraint on the size of video capture devices, this is decreasingly the case, particularly with fixed focus optical devices. Third, digitization of image capture and storage technology has enabled a transition away from film media and toward digital storage media. Modern digital storage media, such as a micro flash chip, can hold many thousands of pictures, feature-length video, and more, on a small flat memory chip that can be plugged into a cell phone, or other hand-held electronic device.

While there has been great technological advancement in optical devices generally, image capture and image processing have observed very profound advancements in particular. For instance, digitization of image capture technology has facilitated great advancements in camera and video recording electronics. Digital image sensors generally comprise a two-dimensional grid of light-sensitive electronic pixels, which can detect varying levels of light energy, varying wavelengths of light, and other optical characteristics. Light incident upon a digital image sensor can be captured by the grid of pixels and—because respective pixels are sensitive to variations in light energy and wavelengths—spatial variations in brightness, contrast and even color over the two-dimensional grid can be captured. When coupled with a suitably positioned optical lens, the incident light can form an image that is projected onto and captured by the digital image sensor. The sensor can then output image data for storage, data processing, image processing, or the like.

One aspect of optical electronic devices receiving significant consumer demand is increased optical resolution. High definition video and television, for instance, refer to higher optical resolution of a display, sometimes referred to as a number of pixels in the display. Increased resolutions often involve higher quality optics and the capture of more optical information. As a result, processing this information at speeds suitable for video utilizes high speed analog and digital circuitry, including processors, memory and clock speeds. These higher speeds can also extend to image processing electronics, which convert image information output by an optical sensor into a usable form for graphical display. A general rule in electronics is that faster signal processing, particularly analog signal processing, consumes more electronic power. In addition, as image capture devices transition to high definition imaging, the graphical resolutions increase and result in the capture and processing of more information at a predetermined frame rate, further increasing power consumption. Moreover, secondary functions, such as real-time error correction, signal conditioning, signal analytics and feedback, and so on, place additional demands on processing equipment. Providing technological improvements while mitigating the impact on resource consumption is among the many challenges that provide a framework for much of existing research and development in optical electronics and related industries.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

Aspects of the subject disclosure provide for analog averaging of optical black pixels within an optical sensor. The optical black pixels can be employed in conjunction with data correction for active pixels of the optical sensor. By utilizing analog averaging, optical black pixel information can be obtained much more quickly than with digital counterparts, significantly improving processing demand and data transfer speeds for optical sensors.

In further aspects of the subject disclosure, provided is an analog circuit for generating an analog average of optical black signals. The analog circuit can comprise a set of analog switches interconnecting parallel output buses of an optical sensor. The analog average can then be extracted from a subset of the output buses, reducing time required to generate an average of optical black signals as compared with other techniques that sequentially output each signal from analog circuitry prior to averaging. In some aspects, a plurality of these averages can extracted and further conditioned in conjunction with generating a final analog average.

According to further aspects of the subject disclosure, circuitry is provided to pre-filter optical black signals for inclusion in signal averaging. A comparator can be employed to compare respective signals to a predetermined reference signal. If the comparator determines that a tested signal is outside an acceptable range of the predetermined reference signal, a bypass circuit can be activated. The bypass circuit can be configured to exclude the tested signal from signal averaging. In this manner, suspect signals can be excluded to avoid improper effects on the signal averaging.

In at least one disclosed aspect, the subject disclosure provides an optical sensor, comprising an optical pixel array, which in turn can comprise rows and columns of optical pixels. A subset of the columns of optical pixels can comprise respective pluralities of optically black pixels. In addition, the optical sensor can comprise a readout circuit for extracting information from the optical pixel array, where the readout circuit extracts signals from a set of optically black pixels of the subset of the columns of optical pixels, and generates an analog average of the signals. Moreover, the readout circuit can be configured to output the analog average to a digital circuit that is configured to employ the analog average for a digital data correction of optical pixel array data.

In still other aspects of the subject disclosure, provided is a method of reading data from an optical sensor. The method can comprise reading out a set of signals from optically black pixels of a pixel array and generating an analog average from a subset of the set of signals. Moreover, the method can comprise reading out active data from active pixels of the pixel array, and digitizing the analog average and the active data. In addition to the foregoing, the method can comprise employing the digitized analog average for correcting the active data.

In at least one further aspect, the subject disclosure provides an apparatus that provides line correction for image information generated by an optical sensor. The apparatus can comprise a data readout circuit comprising column buffers connected to respective column output lines of an optical pixel array, and respective sampling capacitors connected to respective column buffers. Moreover, the apparatus can comprise a set of switches configurable to electrically connect or electrically isolate a variable subset of the respective sampling capacitors, an analog to digital converter and a digital correction circuit. Particularly, the set of switches can be configured to electrically connect a selected subset of the respective sampling capacitors to generate an analog average of signals output by optically black pixels of the optical pixel array. Moreover, the set of switches can be configured to electrically isolate the respective sampling capacitors in response to the data readout circuit receiving optical image signals output by active pixels of the optical pixel array. In some aspects, the analog to digital converter can digitize the analog average and the optical image signals, and the digital correction circuit can utilize the digitized analog average for correcting the digitized optical image signals The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
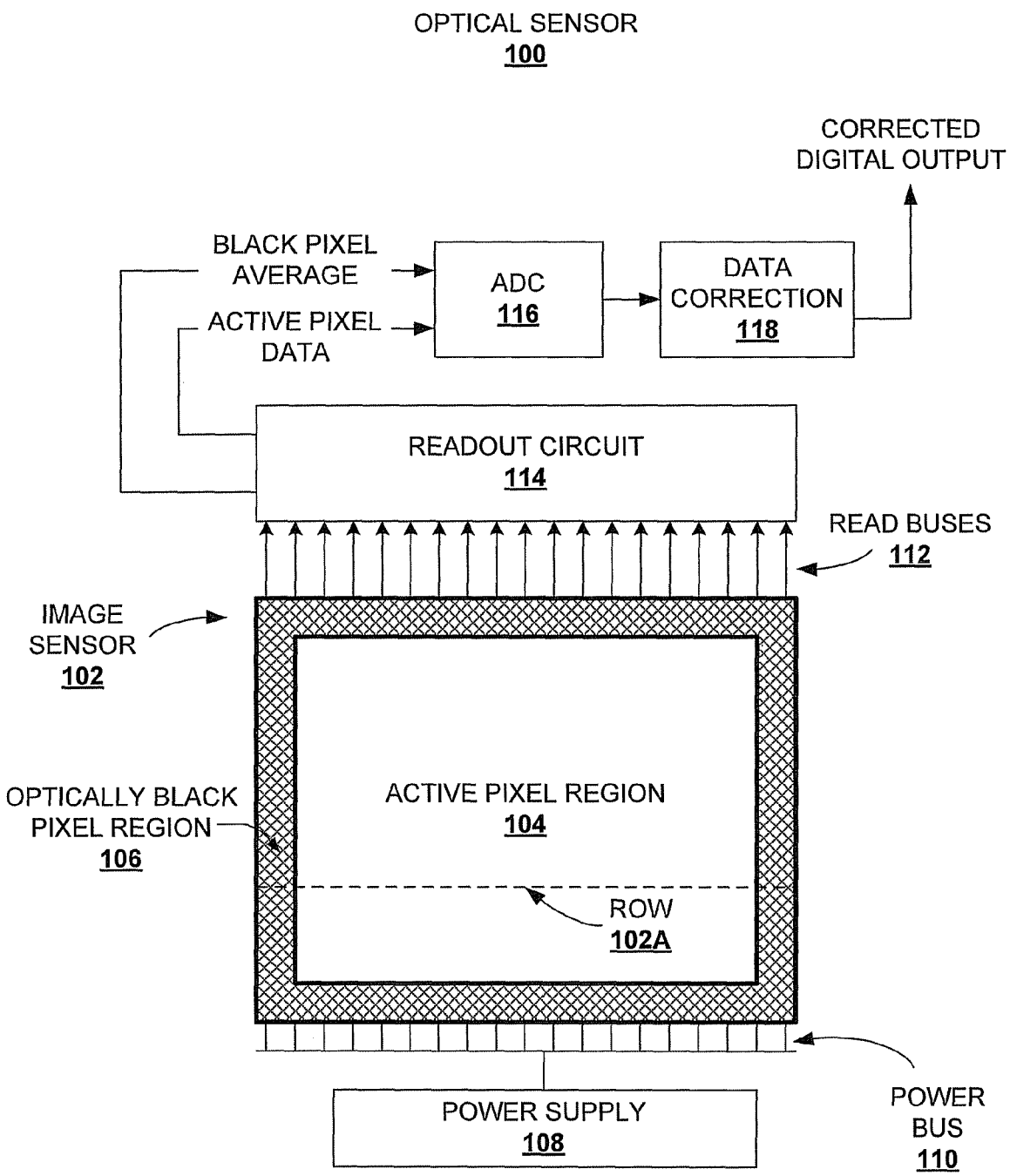
FIG. 1 illustrates a block diagram of an example optical sensor and related data readout circuit in one or more aspects of the subject disclosure.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

As utilized herein, terms "component," "system," and the like are intended to refer to an electronic or computing entity, either hardware, software (e.g., in execution), or firmware. For example, a component can be one or more semiconductor transistors, an arrangement of semiconductor transistors, a circuit, data transfer or integration circuitry, an electronic clock, a process running on a processor, a processor, an object, a state machine, a computer, etc. By way of illustration, a circuit, a transistor array electrically connected with the circuit, or a controller that manages data flow between the transistor array and the circuit can be a component. Furthermore, an apparatus can comprise one or more components that operate together as a system. For instance, the apparatus can comprise an arrangement of electronic hardware, data transfer circuits, logical control circuits, memory circuits that store processing instructions, and a processing circuit that implements the processing instructions in a manner suitable to perform an electronic or computing task.

Furthermore, various aspects of the disclosed subject matter can be implemented as a method, apparatus, or article of manufacture using typical manufacturing, programming or engineering techniques to produce hardware, firmware, software, or any suitable combination thereof to control an electronic device to implement one or more of the disclosed aspects. The term "article of manufacture" as used herein is intended to encompass an electronic device, a semiconductor device, a computer, or a computer program accessible from any computer-readable device, carrier, or media. By way of example, and not limitation, computer-readable media can include hardware media, or software media. In addition, the media can include storage media, transport media or communication media. For example, computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include a data transfer bus, a signal interface (e.g., a wireless communication interface), or the like. Of course, those skilled in the art will recognize many modifications can be made to this configuration without departing from the scope or spirit of the disclosed subject matter.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Various aspects of the subject disclosure provide for low power, high resolution analog to digital conversion. In particular aspects, the analog to digital conversion can be utilized in conjunction with an optical sensor array and digital electronic camera, although the scope of the subject disclosure is not limited to these aspects.

As demand for imaging technology increases, related electronic circuitry capable of providing desired technological advancement is also required. Improvements in graphical resolution, frame rates, signal processing, effects such as three-dimensional display, and the like, involve storing and processing larger quantities of data as compared with other technologies. Processing more information while maintaining overall frame rates can involve higher clock speeds, higher power consumption, and the like. Processing demands stress the capabilities of existing technology, often requiring new designs tailored to meet these demands. With respect to an optical sensor, for instance, system-level improvements in resolution, frame rates, etc., can correspond with improvements to optical sensor technology. For instance, higher resolution involves a greater number of pixels (e.g., the society of motion picture and television engineers [SMPTE] 1080p60 standard defines a line having 2200 pixels, including 1920 active pixels and 280 blanking pixels) and in turn may involve improved signal buffer and transfer speeds, heat dissipation, and so on.

Figure 2:
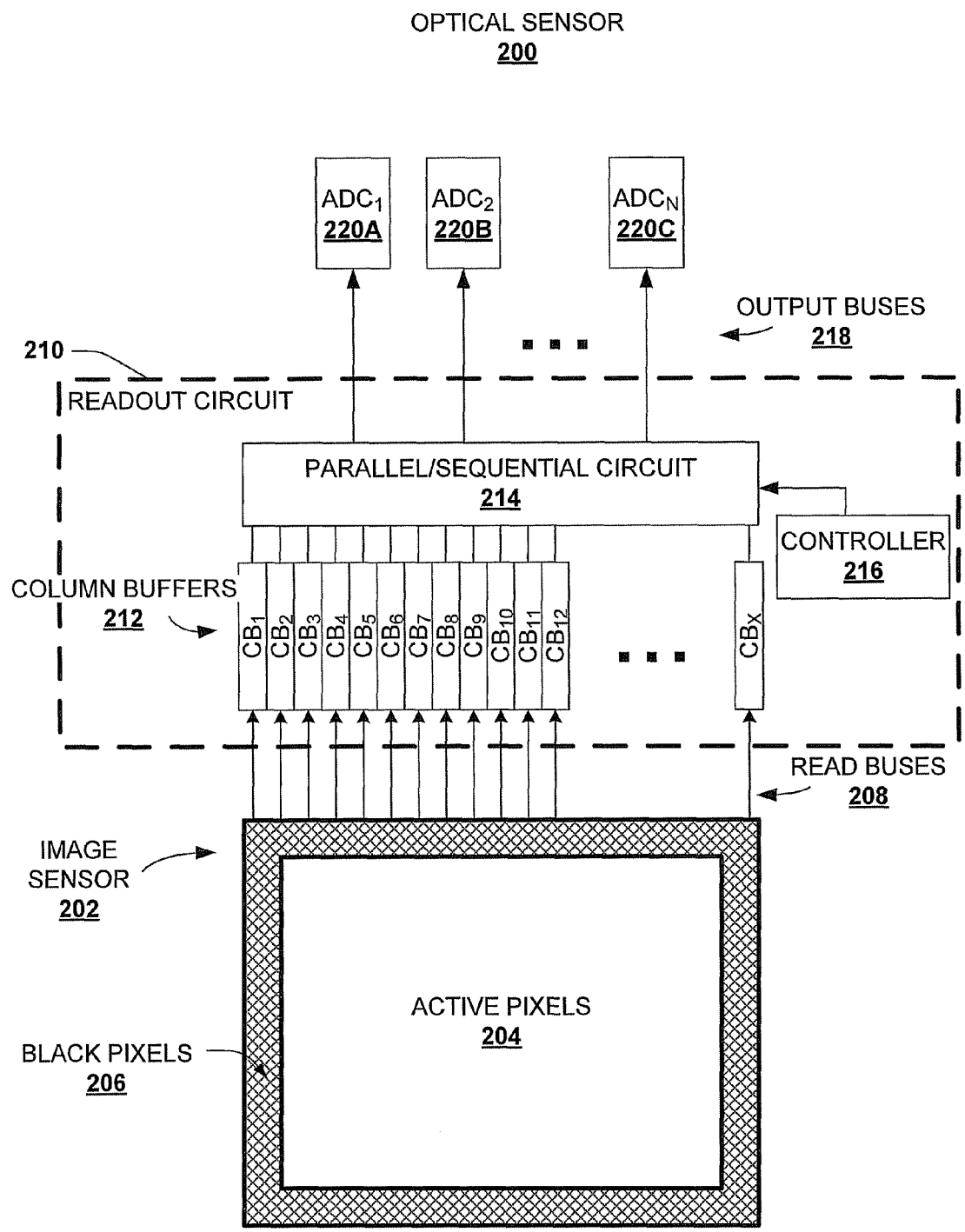
FIG. 2 depicts a bock diagram of a sample optical sensor and readout circuitry according to additional disclosed aspects.

In many optical sensor arrangements, an array of optical pixels—also referred to as a pixel array—comprises optical black pixels arranged in a predetermined manner relative to active pixels (e.g., see FIGS. 1 and 2, infra). As utilized herein, optical black pixels refer to pixels that are shielded from radiation that is incident upon a surface of an optical sensor. Shielding can comprise covering a light-sensitive portion of optical black pixels with a light-absorbing medium, as one example, to absorb light that might otherwise impact the light-sensitive portion. Suitable light-absorbing media can include light-absorbing metal layers, or the like. Active pixels, on the other hand, are pixels that are exposed to the incident radiation. The active pixels are utilized to capture an image projected onto the surface of the optical sensor. Optical black pixels can be used, for instance, for line noise correction, optical black clamp algorithms, and so on.

The number of optical black pixels in an optical array can be a function of readout granularity, area requirements and line time. As an example, an optical sensor might include 128 usable optical black pixels per line, 196 optical black pixels per line, or other numbers of optical black pixels. From a data readout perspective, signals from optical black pixels can be read out from an optical sensor in a similar order and rate, and utilizing the same circuitry as active pixels. Thus, from the perspective of the readout circuitry, in some optical sensor arrangements there can be little practical difference between reading data from optical black pixels as compared with active pixels. As an example, optical black pixels can be read out at a beginning of a line of pixels (also referred to herein as a line), averaged to obtain a black level reference, which can then be utilized for data correction on active pixel signals. In the digital domain, averaging can be accomplished with adders, shifters, dividers, or the like, or a suitable combination thereof. As a particular example, shifters can be utilized instead of dividers to reduce semiconductor area dedicated to generating a digital average of optical black signals. When utilizing shifters, the number of optical black signals read out and employed for the black level reference is a power of 2 (e.g., $2^6$ or 64, $2^7$ or 128, $2^8$ or 256, . . . ), providing one example of a practical limitation on a number of optical black pixels usable for generating the black signal average, in addition to others described below.

Desired line noise correction performance in correcting active pixel signals often involves at least 100 optical black pixel signals. Generally, 100 or more such black pixel signals can produce a suitable black signal average for commonly desired line noise correction performance. From a statistical standpoint, the more optical black pixel signals available the better the line noise correction performance. However, practical limitations on the number of black pixel signals exist, placing upper bound limits on a total number that can be utilized.

One example of a practical limit on black pixel signals is a power-of-2 relationship between inputs and output of digital shifters, where digital shifters are utilized to produce a black signal average. Additionally, restrictions on chip area, as well as line readout time can place practical limits on the number of black pixels, or the number of black pixel signals that can be read out for the black signal average. In the case of chip area, a larger number of pixels (including black pixels) tends to increase optical sensor area. Where a limit on chip area exists, there is often a corresponding proportional limit on a total number of optical black pixels. Regarding line readout time, consider the 1080p60 standard having 280 blanking pixels per line as an illustrative example. Optical black pixels are read out during a period referred to as a blanking period. Duration of the blanking period can often be constrained by overall system timing requirements. Thus, where system constraints limit the blanking period to less than 280 clock cycles, sequential readout of all optical black pixels in a pixel array during the blanking period can be precluded. Since digital averaging involves sequential readout of each analog signal to be averaged, followed by analog to digital conversion of each such signal, this effectively limits a number of signals that can be included in the black signal average, and therefore limits statistical efficacy of the black signal average in line noise correction and other functions.

Aspects of the subject disclosure provide improved black signal averaging for optical sensor applications. Black signal averaging can be conducted very quickly compared to other implementations, greatly mitigating impact of line readout times on black signal averaging. This has the added benefit of increasing, as a practical matter, a number of black pixel signals employed for a black signal averaging, improving statistical efficacy of black signal average operations. Additionally, circuitry employed for implanting black signal averaging as described herein can reduce chip area consumption as compared with other implementations, reducing overall chip size. This provides added flexibility with existing chip dimensions, and can facilitate reduced chip sizes compared with other implementations.

As a particular example, aspects of the subject disclosure provide for averaging optical black signals utilizing analog circuitry. Analog averaging can be implemented by parallel connection of readout capacitors on respective ones of a set of column buffers of a data readout circuit. Parallel connection of capacitors results in charge re-distribution across connected capacitors, leading to a voltage across the connected capacitors that is an average of respective voltages at each capacitor. Moreover, a value of the average voltage can be extracted from a subset of the column buffers (e.g., from one column buffer, two column buffers, . . . ), reducing a number of sequential output signals to be extracted from the set of column buffers.

In one or more aspects, the parallel connection between column buffer sampling capacitors can be implemented with a set of T-switches. T-switches utilized as described herein can reduce cross-talk between column buffers. In these aspects, the set of T-switches can be turned on and off utilizing a read state machine signal. Particularly, the read state machine can be configured to turn on the T-switches after a sampling phase of an optical circuit. Optical black signals can be sampled and averaged during the sampling phase, after which the read state machine can be configured to turn off the T-switches in preparation for a readout phase. During one portion of the readout phase the optical black pixel signal average(s) is(are) read out, and in another portion of the readout phase readout of active pixel signals can occur. The active pixel signals can then be processed with information derived from the black pixel signals.

Referring now to the drawings, FIG. 1 illustrates a block diagram of an example optical sensor 100 according to one or more aspects of the subject disclosure. Optical sensor 100 can be configured to provide analog signal averaging to reduce line time of readout operations of optical sensor 100, reduce associated digital components and area consumption of such components, or improve performance of data processing algorithms related to optical black pixel signals. For instance, the analog signal averaging can facilitate full utilization of optical black signals, resulting in improved statistical efficacy of functions utilizing these signals. In addition, a number of optical black pixels is not limited by line time or a power-of-2 relationship, providing greater flexibility for pixel arrays. Thus, optical sensor 100 and other embodiments disclosed herein provide significant advantages in the field of optical sensors.

Optical sensor 100 can comprise an image sensor 102 that includes an active pixel region 104 near a center of image sensor 102, and an optically black pixel region 106 near a periphery of image sensor 102. Active pixel region 104 is comprised of a set of active pixels configured to generate and store respective electric signals in response to electromagnetic energy that is incident upon active pixel region 104. Optically black pixel region 106 comprises optical black pixels configured to be substantially unaffected by, or little affected by, electromagnetic energy incident upon image sensor 102. Instead, optical black pixel region 106 can be utilized to provide a baseline electric signal level of optical pixels within image sensor 102. The baseline electric signal level can result from cross-talk between image sensor 102 and a power supply 108 or power bus 110 utilized to provide electric power to image sensor 102, from scattered light affecting image sensor 102, or a similar noise or interference phenomena affecting optical pixel signals, or a suitable combination thereof. Moreover, the baseline signal level can be utilized to correct for these phenomena as part of line noise correction algorithms.

Image sensor 102 is connected to a set of read buses 112. Read buses are configured to transfer information (e.g., signals) from respective pixels in respective columns of image sensor 102 to other signal components of optical sensor 100. As an example, optical sensor 100 can include N read buses 112 where each read bus 112 can be associated with a respective column of image sensor 102, where N is a positive integer. In an alternate example, columns of pixels can share a read bus 112, facilitating N to be smaller than a number of columns in image sensor 102.

As image sensor 102 is oriented, respective rows of pixels that comprise active pixels include two sets of optical black pixels, a first set on the far left of image sensor 102 and a second set on the far right of image sensor 102, as well as a contiguous set of active pixels within active pixel region 104 that is between the sets of optical black pixels. For instance, row 102A represents a single row of pixels, indicated by the dashed line extending left to right along image sensor 102, crossing active pixel region 104. Row 102A comprises a first set of optical black pixels at the left-most portion of the dashed line within the shaded optically black pixel region 106, followed by a set of active pixels where the dashed line crosses the white un-shaded active pixel region 104, and finally a second set of optical black pixels where the dashed-line crosses the right-most portion of the shaded optically black pixel region 106.

Data is read out from image sensor 102 one row at a time. In at least one aspect, a bottom-most row closest to power supply 108 can be read out first, and a top-most row closest to read buses 112 can be read out last, though optical sensor 100 is not limited to this aspect(s). Further, pixel signals within a given row can be read out concurrently on one of read buses 112, sequentially on respective ones of read buses 112 (e.g., left to right, right to left, or some suitable alternative), or respective subsets of pixels within the given row can be read out in a suitable sequence, where the size of respective subsets can be fixed or can vary, and the sequence can be fixed or can vary. Where pixel signals are read out left to right (or right to left), readout generally starts with a first set of optical black signals, followed by a larger set of active signals, and finally a second set of optical black signals. Each signal in the given row is read out onto a corresponding one of read buses 112 associated with a column in which respective ones of the signals are situated. Thus, with reference again to row 102A, a left-most pixel is read out on a corresponding left-most one of read buses 112, a second left-most pixel is read out on a corresponding second left-most one of read buses 112, and so on, until a right-most pixel is read out onto a corresponding right-most one of read buses 112.

In one aspect of the subject disclosure, sets of optical black pixel signals in a given row can be utilized for data correction of active signals within that given row. Thus, with reference again to row 102A, the optical black pixel signals of row 102A can be averaged by system 100 for line noise correction or other suitable data correction of the active pixels of row 102A. In this aspect, rows comprising no active pixels (e.g., rows outside of active pixel region 104) can be employed for non line-specific data correction algorithms, can be employed in part for line-specific noise correction in conjunction with optical black signals of one or more rows, or the like, or a suitable combination thereof.

Although image sensor 102 is depicted having optically black pixel region 106 around a circumference of active pixel region 104, It should be appreciated that image sensor 102 can be oriented in a different manner, without departing from the scope of the subject disclosure. For instance, optical black pixels can be located in a horizontal strip(s) at the top or bottom of image sensor 102, or along a vertical strip(s) at the left or right side(s) of image sensor 102, instead of about the circumference thereof. In the case of optical black pixels located at a horizontal strip at the top of image sensor 102, rows of optical black signals can be read out by read buses 112 last, and preceded by rows of active signals. In another arrangement, optical black pixels can be located in a subset of rows at the bottom of image sensor 102, so that active pixels are read out last, and preceded by optical black signals. Thus, it should be appreciated that the subject disclosure is not limited by the orientation of optical black pixels and active pixels of image sensor 102, except where clear from context.

Pixel information conveyed via read buses 112 are received at a readout circuit 114. Readout circuit 114 can be configured to average at least a subset of optical black signals output by read buses 112. Further, readout circuit 114 can be configured to average signals for a first subset of signals (e.g., optical black signals) and sequentially output a second subset of signals without averaging (e.g., active signals). In a particular aspect, readout circuit 114 can include a controller (e.g., a read state machine—not depicted, but see FIG. 2 or 3, infra) that activates an averaging circuit for one or more subsets of readout circuit 114 that receive optical black pixels (e.g., a left-side subset and a right-side subset of readout circuit 114 when row 102A comprising active pixel signals is read out). The controller can also be configured to deactivate (or leave deactivated) the averaging circuit for subsets of readout circuit 114 that receive active pixel signals. Further, the controller can be configured to activate the averaging circuit for all of readout circuit 114 when a row of all optically black pixel signals is received, and deactivate (or leave deactivated) the averaging circuit for all of readout circuit 114 if a row comprising all active pixels is received (not depicted).

Figure 6:
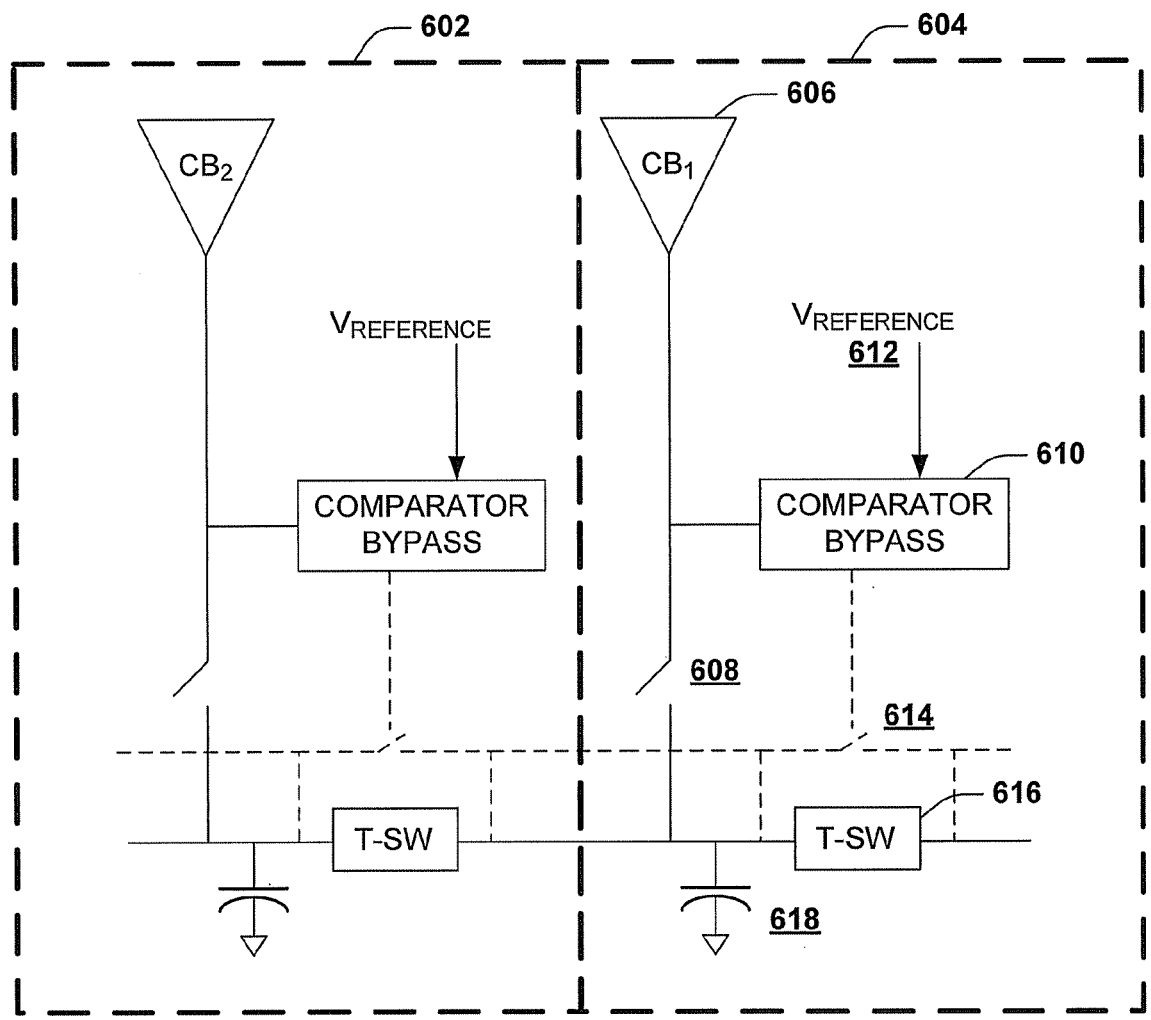
FIG. 6 illustrates a circuit diagram of an example circuit for filtering optical black signals according to additional aspects.

In at least one aspect of the subject disclosure, readout circuit 114 can further comprise a filtering function that filters out optical black signals outside a predetermined signal level, or range of signal levels (e.g., see FIG. 6, infra). The filtering function can compare respective optical black signals to a reference signal (or range of signals). Those optical black signals satisfying an acceptance function related to the reference signal (e.g., within a predetermined range of the reference signal) can be included by the filtering function within a black signal average. Optical black signals failing to satisfy the acceptance function (or satisfying an exclusion function) can be excluded from the black signal average. Excluded signals can be replaced by a reference black signal level, in one aspect of the subject disclosure, or can simply be removed from the averaging, in an alternative aspect.

In additional aspects of the subject disclosure, the filtering function can comprise a column buffer clamp. The column buffer clamp can compare the output of a column buffer with a reference voltage. If the column buffer output is high (a hot pixel) or low (a dead pixel), the column buffer output can be replaced or excluded by the column buffer clamp from a black signal average. To replace a column buffer output, the column buffer clamp can activate a reference replacement voltage and provide the reference replacement voltage as a substitute for the column buffer output for generating the black signal average. To exclude the column buffer output, the column buffer clamp can gate or bypass the column buffer output, thereby preventing a high or low pixel signal from being included as part of a black signal average generated by an averaging circuit (e.g., see FIG. 6, infra).

After generating the black signal average, the average can be read out from any of a set of column buffers utilized in generating the average. Alternatively, multiple average levels from a subset of the set of column buffers can be extracted by readout circuit 114. The multiple average levels can be utilized to reduce temporal noise or improve yield in the case of a bad column buffer. Once generated and read out, the black signal average is provided to an analog to digital converter (ADC) 116, along with active pixel signals output by image sensor 102. ADC 116 can convert respective signals into digital form, outputting a digital form of the black signal average, as well as respective digital forms of the active pixel signals. Digital information can be provided to a data correction component 118.

Data correction component 118 can be configured to employ one or more algorithms, functions, processes or the like, to process, condition, correct, etc., the active pixel signals. Particularly, black signal information can be utilized for line noise correction of active pixel signals. A corrected digital output is generated by data correction 118 in response to applying one or more of these algorithms, functions, processes, . . . , and output from optical sensor 100.

It should be appreciated that image sensor 100 can reduce readout time of optically black signals by utilizing analog black signal averaging, as compared with digital black signal averaging. In the latter technique, black signal levels are read out sequentially, converted into digital form, and averaged to provide a digital black signal average. Sequential readout of 128 optical black signals to produce the digital information for the averaging, however, can often require one clock pulse per optical black signal, or 128 clock pulses. Averaging 128 optical black signals in the analog domain can be done in as little as a single clock pulse, however, in the event that 128 column buffer capacitors (or a subset thereof in the event of averaging less than 128 signals) are inter-connected in parallel for the clock pulse, yielding an average voltage pertaining to all (or the subset) of the optical black signals. Thus, analog averaging can reduce readout time of image sensor 102 by 127 clock pulses, in this example. For an optically black row, a much greater reduction in readout time can be achieved, as an optical black signal average of all pixels in the optically black row can be performed in as little as one (or a few) clock cycles. Moreover, it should be appreciated that since analog averaging can be conducted for different numbers of optical black signals without impacting readout time (e.g., by including different numbers of column buffer capacitors in an inter-connected parallel circuit), additional black pixel signals can be utilized without impacting the readout line time. This facilitates full utilization of optical black pixels, potentially improving statistical significance of black signal averaging operations. Moreover, analog averaging can have the inherent benefit of reduced quantization noise as compared with digital averaging. In addition, analog averaging can be implemented with analog circuitry that consumes less semiconductor space as compared with digital components (e.g., adders, shifters, dividers, . . . ), depending on the analog averaging circuit used. Thus, size constraints of optical sensor 100 can be alleviated with the analog averaging circuitry, in at least some aspects. Thus, optical sensor 100 provides significant advantages over other optical sensors in multiple aspects of sensor technology.

FIG. 2 depicts a block diagram of an example optical sensor 200 according to alternative or additional aspects of the subject disclosure. Optical sensor 200 can comprise an image sensor 202 electrically connected to a readout circuit 210 by a set of read buses 208. In at least one aspect of the subject disclosure, at least one of image sensor 202, readout circuit 210 or read buses 208 can be substantially similar to image sensor 102, readout circuit 114, or read buses 112, respectively, of FIG. 1, supra. However, the subject disclosure is not limited to this aspect(s), and image sensor 202, readout circuit 210 or read buses 208, respectively, can have a subset of the features of corresponding entities of FIG. 1, additional features not included in the corresponding entities, or an entirely different set of features. Moreover, some components of FIG. 2 can be similar to corresponding components of FIG. 1, while others can be different. For instance, image sensor 202 could be substantially similar to image sensor 102 while readout circuit 210 can comprise a subset of features of readout circuit 114, or additional features, as suitable.

Image sensor 202 can comprise a set of active pixels 204 and a set of optical black pixels 206, as depicted. Information captured by respective optical pixels of image sensor 202 can be output by a set of read buses 208. In a particular embodiment, respective ones of read buses 208 are configured to output information sequentially from respective columns of image sensor 202 (e.g., left to right, right to left, . . . ), when reading out a given row of pixel signals of image sensor 202. As an illustrative example, when reading out a row of image sensor 202, information from a pixel within a first column of pixels (e.g., a left-most column of image sensor 202) is read out from image sensor 202; information from a pixel within a second column of pixels is read out subsequently, and so on, until information from an $X^{th}$ within an $X^{th}$ column of pixels is read out last, where X is a number of read buses 208 and a number of corresponding columns of image sensor 202. In an alternative or additional embodiment, read buses 208 can be configured to output information from a subset of columns (including all columns) of a row of image sensor 202 concurrently (e.g., a row of data—one pixel signal per respective ones of read buses 208—per data transfer cycle). In at least one aspect, read buses 208 can be configured to output active pixel data from respective columns or subsets of columns sequentially, and output optical black pixel data from the columns in parallel, or other suitable arrangement.

Data read out from image sensor 202 is conveyed by read buses 208 to readout circuit 210. In one or more aspects, read buses 208 convey data from respective columns of image sensor 202 to corresponding ones of a set of column buffers 212. In this aspect(s), readout circuit 210 can comprise X column buffers 212, each corresponding with one of X columns of image sensor 202. In other aspects, readout circuit 210 can comprise fewer than X column buffers 212. In this case, one or more read buses 208 can convey data from a plurality of columns of image sensor 202 to a single column buffer 212.

Column buffers 212 can be configured to amplify (e.g., condition) signals from image sensor 202. Further, each column buffer 212 can facilitate low noise readout, and can condition a signal from a pixel positioned at one of the rows in the column (or columns) corresponding to the respective column buffer 212. Conditioned signals are output by respective column buffers 212 to a parallel/sequential circuit 214.

Parallel/sequential circuit 214 can be configured by a controller 216 to operate in a first manner for signals output by a first subset of pixels, and to operate in a second manner for signals output by a second subset of pixels. For example, parallel/sequential circuit 214 can be configured by controller 216 to generate an analog average of input signals of the first subset of pixels (e.g., optical black signals), and configured by controller 216 to multiplex (or partially multiplex) signals of the second subset of pixels (e.g., active signals) in a sequence onto one or more output buses 218. In a particular aspect, controller 216 can activate an averaging circuit corresponding with a subset of column buffer 212 outputs (e.g., see FIG. 3, infra) in response to signals from the first subset of pixels (e.g., the optical black signals) being output by the subset of column buffers 212, to facilitate generating the analog average of the first subset of pixel signals. Controller 216 can deactivate (or leave deactivated) the averaging circuit for a second subset of column buffer 212 outputs in response to signals from the second subset of pixels (e.g., the active pixels) being received at the second subset of column buffers 212, to facilitate multiplexing signals from the second subset of pixels onto output buses 218.

Results of signal operations performed by parallel/sequential circuit 214 can be output to one or more output buses 218. Output buses 218 can include one or more individual output buses 218, connected to respective ADCs 220A, 220B, . . . 220C (referred to herein collectively as ADCs 220A-220C). In one aspect, optical sensor 200 can comprise a single output bus 218 and a single ADC 220A, in which case parallel/sequential circuit 214 outputs signals received from column buffers 212 by multiplexing the respective signals, or conditioned, processed, or analyzed derivatives thereof, onto the signal output bus 218. In other aspects of the subject disclosure, optical sensor 200 can comprise a plurality of output buses 218 and respective ADCs 220A-220C. In this latter case, parallel/sequential circuit 214 multiplexes signals from respective subsets of column buffers 212 onto respective ones of the plurality of output buses 218. In general, however, optical sensor 200 comprises fewer output buses 218 as compared with read buses 208 and column buffers 212, and thus sequential signals received on read buses 208 are multiplexed as outputs onto output buses 218. Black pixels signals are received by parallel/sequential circuit 214 and input into an analog function to produce a function result signal(s) (e.g., a black signal average, . . . ). The function result signal(s) can be transmitted onto output buses 218 as a single output in the event of a single result signal (e.g., a single sampling of the black signal average). Alternatively, the function result signal(s) can be output sequentially onto output buses 218 in the event of multiple result signals (e.g., multiple samplings of the black signal average), or as an aggregate result of multiple such results (e.g., a further average, a mean of multiple averages, a mode of multiple averages, . . . ).

Signals received by ADCs 220A-220C can be converted from an analog format to a digital format. Digital signals can be output for further processing, such as error correction. Note that the column parallel architecture of read buses 208 can facilitate sequential or parallel output of signals from image sensor 202. For instance, in one example, a row of black pixel signals can be output from image sensor 202, conditioned at column buffers 212 and utilized to generate an average thereof by parallel/sequential circuit 214 in as little as a single clock cycle. In comparison, a digital averaging scheme could involve sequential output of the row of black pixel signals over multiple clock cycles. For instance, if optical sensor 200 comprises a single output bus 218 and ADC 220, readout of the row of optical black pixels could take one clock cycle per optical black pixel in the row. Or, alternatively, if optical sensor 200 comprises a set of output buses 218 and ADCs 220A-220C, readout of the row of optical black pixels can have a duration equivalent to a set of clock cycles corresponding to the set of output buses 218 and ADCs 220A-220C. But the analog average can provide an average of a row of optical black pixels in a single clock cycle even with a single output bus and ADC 220. This is in part because the analog average is generated prior to analog to digital conversion. Therefore, signal information for each of the optical black pixels need not be preserved for the analog to digital conversion, just a functional result, such as a black signal average of the optical black pixel signals. This can result in significant reduction in read time for image sensor 202, as compared with the digital averaging scheme.

Figure 3:
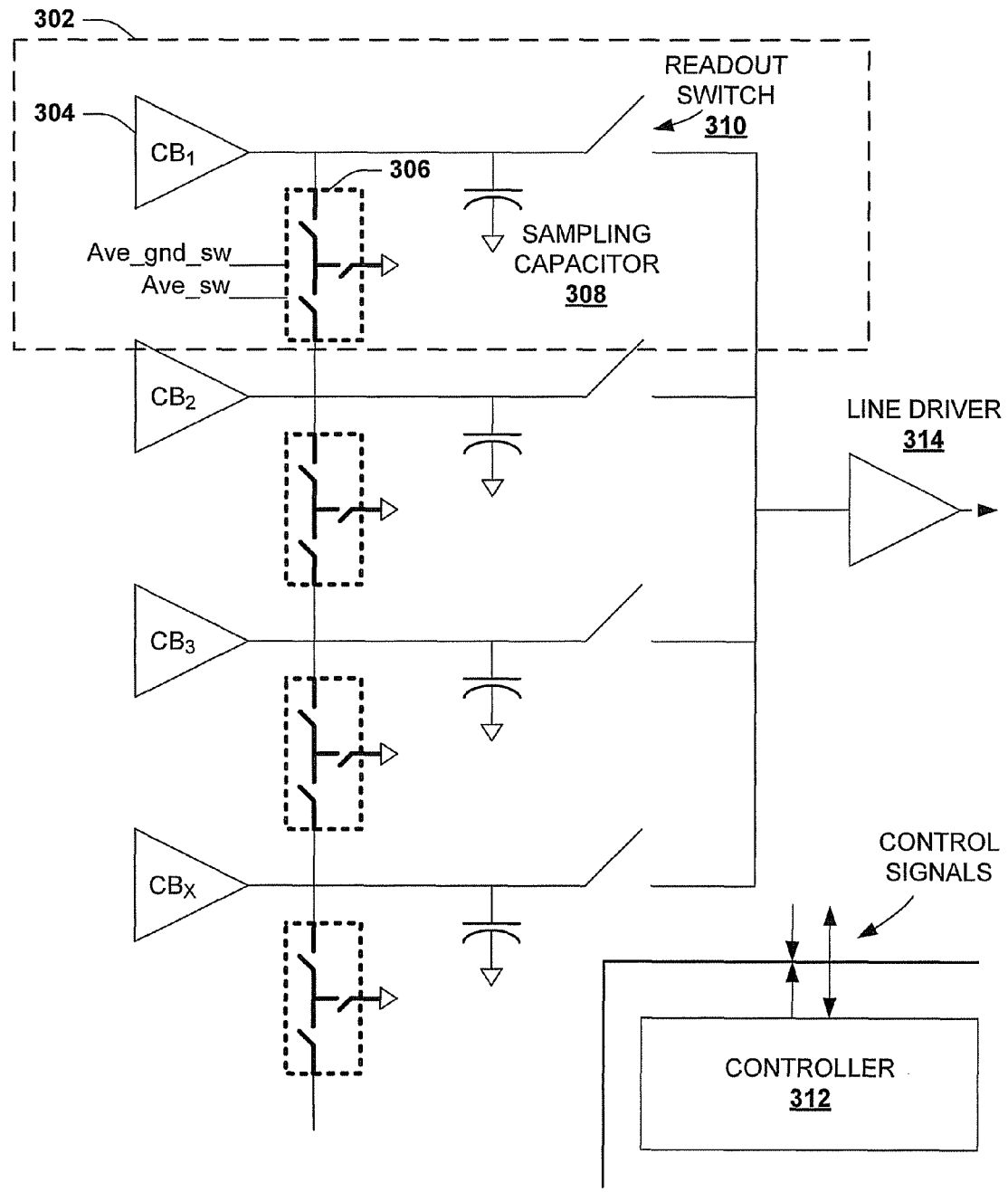
FIG. 3 illustrates a schematic diagram of an example readout circuit for providing an analog average of image sensor signals in further aspects.

FIG. 3 illustrates a circuit diagram of an example analog output circuit 300 for outputting analog information from an optical sensor. Analog output circuit 300 can be configured to condition received signals, including amplify received signals, sample received signals, or multiplex received signals, or a suitable combination thereof. Furthermore, analog output circuit 300 can be configured to generate one or more averages of a set of signals. Accordingly, analog output circuit 300 can be employed to generate an analog average of a set of signals output by the optical sensor, as described herein, or for conditioning and multiplexing the set of signals. Further, analog output circuit 300 can be configured for averaging the set of signals, or configured for conditioning and multiplexing the set of signals, in response to satisfaction of a condition. The condition can be related to a type of optical signal being received, a type of an optical pixel outputting a received signal, a number of the optical pixel within a column of pixels (e.g., a pixel between 1 and 140, between 141 and 1961, between 1962 and 2200, . . . ), or the like, or a suitable combination thereof. Thus, as a particular example, analog output circuit 300 can be configured to generate the analog average for signals output by optical black pixels, or signals output by pixels numbered less than 141 or greater than 1961, and can be configured to condition and multiplex signals output by active pixels, or signals output by pixels numbered from 141 to 1961, and so on.

Analog output circuit 300 is depicted as having a circuit 302 (enclosed by the dashed square depicted in FIG. 3) connected to a set of similar circuits having similar components as circuit 302 (outside the dashed square). Although only circuit 302 is depicted with reference numbers for respective components thereof, it should be appreciated that the reference numbers and electrical components and their respective descriptions below can be equally applicable to any of the circuits of analog output circuit 300 similar to circuit 302 that are not enclosed within the dashed square. Moreover, it should be appreciated that analog output circuit 300 can comprise more or fewer such similar circuits, connected in similar fashion as depicted by analog output circuit 300 (e.g., electrically in parallel). As a particular example, analog output circuit 300 can include a number of circuits—including circuit 302—equaling a number of column buffers of an optical sensor (e.g., X circuit regions in the case of the X column buffers of optical sensor 200, supra). The subject disclosure is not limited to this example, however.

Circuit 302 comprises a column buffer amplifier, $CB_1$ 304, which can receive analog signals from a readout bus of an optical sensor (not depicted, but see FIG. 1 or 2, supra). $CB_1$ can be configured to condition (e.g., amplify) received signals to a selected or predetermined amplitude. Voltages of signals output by $CB_1$ can be stored at a sampling capacitor 308.

In addition to the foregoing, circuit 302 can comprise an averaging switch 306 configured to electrically connect, in parallel, sampling capacitor 308 and an output node of $CB_1$ 304 to an adjacent sampling capacitor and column buffer output node (e.g., $CB_2$ and the sampling capacitor connected thereto). This parallel connection between sampling capacitor 308 and its adjacent sampling capacitor can have the effect of distributing charge between the respective sampling capacitors. The amount of charge on a capacitor is given by the equation $Q=C \cdot V$, where Q is charge, C is capacitance and V is voltage. Referring to sampling capacitor 308 as $capacitor_1$ and its adjacent sampling capacitor as $capacitor_2$, $capacitor_1$ has a charge $Q_1$ defined as $Q_1=C_1 \cdot V_1$, and $capacitor_2$ has a charge $Q_2$ defined as $Q_2=C_2 \cdot V_2$, where $C_1$ and $V_1$ are a capacitance and voltage, respectively, of $capacitor_1$, and $C_2$ and $V_2$ are a capacitance and voltage, respectively, of $capacitor_2$. The amount of charge at each sampling capacitor following completion of the parallel circuit by averaging switch 306 is an average of the total charge at both capacitors, or $(Q_1+Q_2)/2$. Therefore, voltages of the respective capacitors can be given by the following relationships:

$$V_1 = \frac{\left(\frac{Q_1 + Q_2}{2}\right)}{C_1} = \frac{C_1 V_1 + C_2 V_2}{2C_1}; \text{ and } V_2 = \frac{C_1 V_1 + C_2 V_2}{2C_2} \quad (1)$$

Where sampling capacitors of analog output circuit 300 are selected to have substantially the same capacitance, $C_1 \cong C_2$ then the voltages $V_1$ and $V_2$ become:

$$V_1 \cong V_2 = \frac{V_1 + V_2}{2}. \quad (2)$$

Accordingly, upon closing averaging switch 306, voltages at capacitor) and $capacitor_2$ become averaged, providing an analog signal average as described herein. For a number, X, of circuits similar to circuit 302 and an equivalent number of signals, the average voltage of the X signals, $V_{X(final)}$, can be represented as a function of the respective initial voltages, $V_{X(initial)}$, thereof by the following:

$$V_{X(final)} = \frac{1}{C_X} \sum_{X=1}^{X=m} C_X * V_{X(initial)} \quad (3)$$

Control over averaging switch 306 can be accomplished by a controller 312. Controller 312 can issue control signals causing averaging switch 306 to close the parallel connection between sampling capacitor 308 and its adjacent capacitor, as well as one or more other averaging switches of analog output circuit 300. In one aspect, controller 312 can be configured to issue control signals that open or close all averaging switches of analog output circuit 300 concurrently. In an alternative or additional aspect, controller 312 can be configured to bypass one or more sampling capacitors to exclude a particular signal from the averaging. Bypassing a particular signal can be accomplished by selective control of a bypass circuit (not depicted, but see FIG. 6, infra) connected to a sampling capacitor of the particular signal.

Once an average is generated at the sampling capacitors, a readout switch 310 can be activated to output an average voltage, or $V_{X(final)}$, to a line driver 314. Line driver 314 can condition (e.g., amplify, filter, . . . ) the average voltage and output the conditioned average voltage for further signal processing, signal analysis, analog to digital conversion, error correction, and so on. In some aspects of the subject disclosure, controller 312 can be employed to selectively activate a subset of readout switches of analog output circuit 300, to provide multiple samples of the average voltage to line driver 314. Multiple samples of the average can be employed, for instance, to mitigate temporal noise, or improve voltage yield in the event of a faulty component (e.g., a faulty column buffer), or the like.

Figure 4:
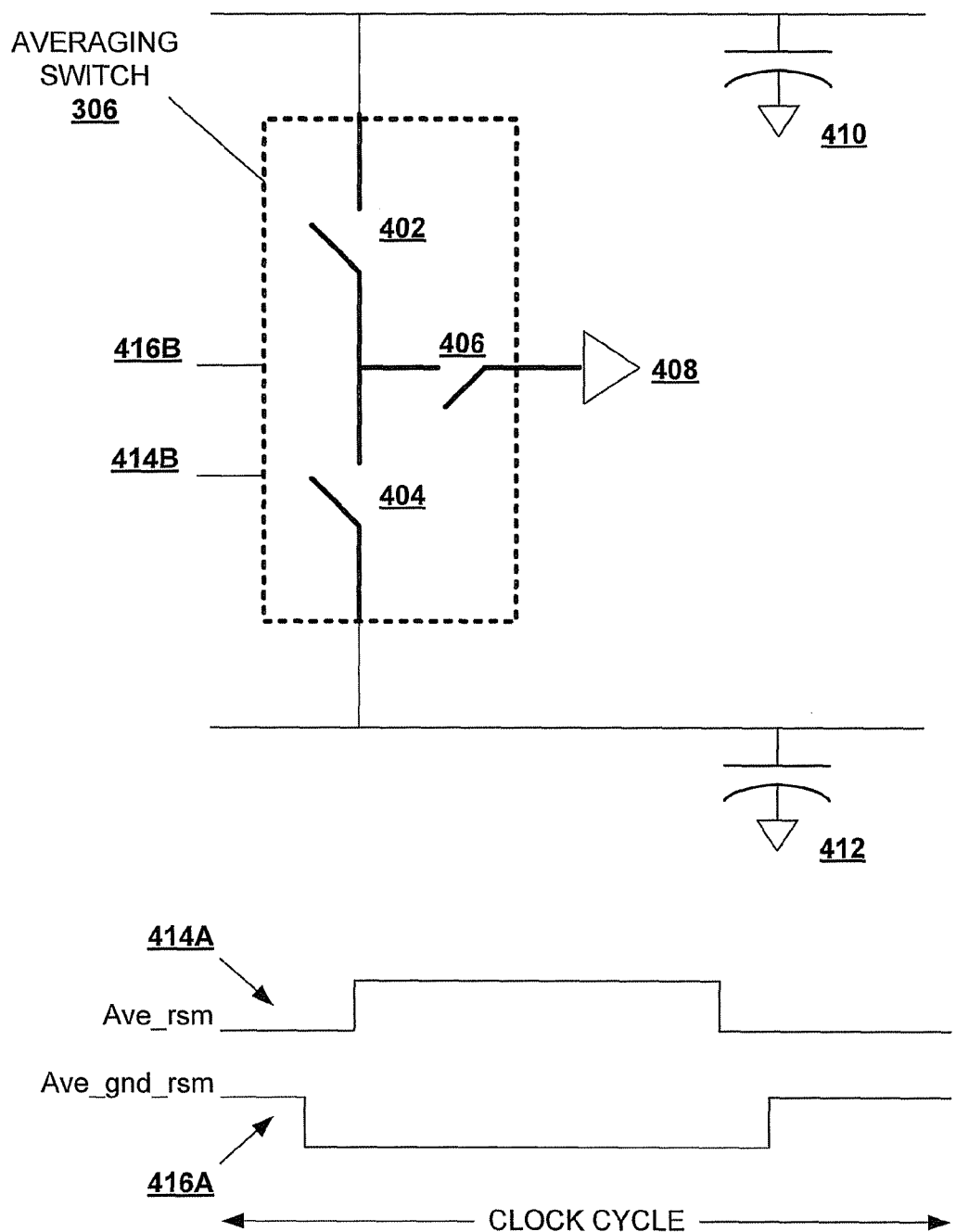
FIG. 4 depicts a block diagram of a sample capacitive coupling switch that generates an analog average of optical signals in particular aspects.

FIG. 4 illustrates a circuit diagram of an example capacitive coupling circuit 400 according to one or more particular aspects of the subject disclosure. Capacitive averaging circuit 400 can comprise averaging switch 306 of FIG. 3, as depicted. Averaging switch 306 comprises a first contact switch 402 in series with a second contact switch 404. In one aspect, first contact switch 402 and second contact switch 404 can be opened or closed independently. In another aspect, first contact switch 402 and second contact switch 404 can be opened or closed concurrently. Parallel to first contact switch 402 and second contact switch 404 is a ground switch 406 connected to a ground 408. Ground switch 406 can be operated to mitigate or avoid cross-talk or unintended charge buildup on the terminals of first contact switch 402 and second contact switch 404, when the latter switches 402, 404 are opened, by grounding contacts between these two switches, as depicted.

In operation, to close averaging switch 306, ground switch 406 is first opened, and subsequently first contact switch 402 and second contact switch 404 are closed. This forms a parallel circuit between a sampling capacitor 410 and a second sampling capacitor 412. As described above with respect to FIG. 3, supra, the parallel circuit can be utilized to generate an average of respective voltage signals at sampling capacitor 410 and sampling capacitor 412, respectively. Averaging switch 306 can be deactivated, to stop the averaging of voltage signals between sampling capacitor 410 and sampling capacitor 412. To deactivate averaging switch 306, first contact switch 402 and second contact switch 404 are first opened, and then ground switch 406 is then closed.

Control of activation and deactivation of averaging switch 306 can be implemented to average some signals at sampling capacitors 410 and 412, and prevent averaging of other signals. For instance, in response to respective optical black pixel signals being input at sampling capacitor 410 and sampling capacitor 412, averaging switch 306 can be activated (e.g., by a controller, such as controller 310 of FIG. 3, infra). This results in an average of the optical black pixel signals at both sampling capacitor 410 and sampling capacitor 412. As another example, in response to respective active pixel signals being input at sampling capacitor 410 and sampling capacitor 412, averaging switch 306 can be deactivated. This results in respective signal voltages at sampling capacitor 410 and sampling capacitor 412, which can be read out independently.

Example control signals 414A and 416A for averaging switch 306 are indicated at the bottom of FIG. 4, which can be applied at example signal inputs 414B and 416B connected to averaging switch 306. Control signal 416A can control ground switch 406, applied at signal input 416B. When control signal 416A is high ground switch 406 is activated, or closed, and when control signal 416A is low ground switch 406 is deactivated, or open. Control signal 414A can control first contact switch 402 and second contact switch 404, applied at signal input 416A. When control signal 416A is high first contact switch 402 and second contact switch 404 are activated, or closed, and when control signal 416A is low first contact switch 402 and second contact switch 404 are deactivated, or open. Note that control signal 416A leads control signal 414A near a beginning of a clock cycle, and lags control signal 414A near an end of the clock cycle. In other words, control signal 416A goes low prior to control signal 414A going high near the beginning of the clock cycle, and control signal 414A goes low prior to control signal 416A going high near the end of the clock cycle. This corresponds with ground switch 406 being closed at the beginning of the clock cycle, and opening (in response to control signal 416A going low) prior to first contact switch 402 and second contact switch 404 closing (in response to control signal 414A going high). Likewise, near the end of the clock cycle, first contact switch 402 and second contact switch 404 open (in response to control signal 414A going low) prior to ground switch 406 closing (in response to control signal 416A going high). This control implementation grounds excess charge at averaging switch 306 when first contact switch 402 and second contact switch 404 are open, and deactivates the connection to ground when first contact switch 402 and second contact switch 404 are closed, forming the parallel circuit between sampling capacitors 410 and 412.

Figure 5:
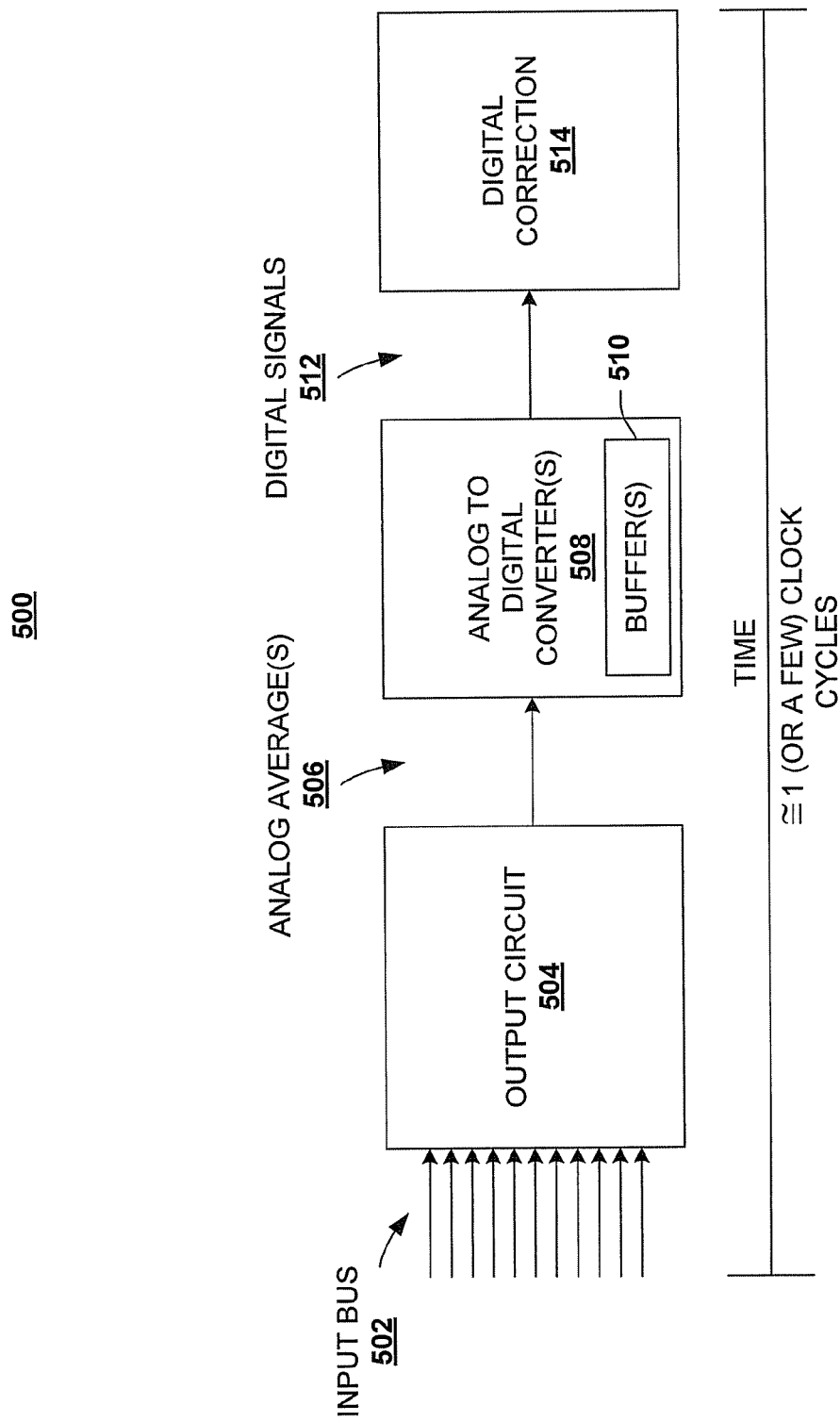
FIG. 5 illustrates a block diagram of an example digital correction process for an optical sensor according to still other aspects.

FIG. 5 illustrates a block diagram of an example system 500 according to further aspects of the subject disclosure. In various disclosed aspects, system 500 can be configured to provide improved signal correction for optical sensor image signals. Particularly, signal correction can be conducted more quickly than other systems, and with greater flexibility on pixel readout and pixel utilization.

FIG. 5 can comprise an input bus 502 configured to obtain and convey signals from an optical sensor (not depicted). Signals conveyed by input bus 502 are received at an output circuit 504. Output circuit 504 can be configured to condition received signals, average received signals, and output conditioned signals or signal average(s).

In the case of optical black signals, output circuit 504 can receive these signals in parallel over input bus 502, and generate an average of these signals (e.g., see FIG. 3, supra). One or more samples of the average can be output as an analog average(s) 506 to an analog to digital converter(s) 508. Analog to digital converter(s) 508 can convert the analog average(s) 506 to digital form. Input analog signals or output digital data can be stored in a buffer(s) 510, as needed. Digital signals 512 are output by analog to digital converter(s) 508 to a digital correction component 514.

Digital correction component 514 can be configured to employ a first signal or set of signals, for correcting a second signal or set of signals. Particularly, a set of active pixel signals comprising digital optical information captured by an image sensor can be corrected for line noise by black signal average data. Moreover, the black signal average data can be generated and output to digital correction component 514 in as little as a single clock cycle (in the event of a single average) or a few clock cycles (in the event of multiple averages). Further, a diverse number of black pixel signals can be employed for the black signal average, since the averaging is done by output circuit 504 in the analog domain. This can lead to improved quantization noise as compared with digital averaging schemes. In addition, an analog averaging circuit can often be constructed in a fraction of silicon space required to create digital adders, shifters or dividers employed for the digital averaging schemes. This can reduce overall size of an optical sensor chip, or potentially facilitate a sensor with a larger pixel array yielding higher optical resolution.

Active pixel signals received at digital correction component 514 are processed utilizing the black signal average data. Processed signals can be output by digital correction component 514. After outputting processed signals, a subsequent black signal average from a subsequent line of pixels can be received, along with associated active pixel data for the line of pixels. This process can be repeated until each line of an optical sensor is read out, digitized, and corrected by system 500.

FIG. 6 depicts a circuit diagram of a sample analog output circuit 600 according to still other aspects of the subject disclosure. Analog output circuit 600 can be configured to selectively include signals in, or exclude signals from, an analog signal averaging circuit. Selection can be based on satisfaction of one or more predetermined criteria in particular aspects. As one example, the criteria can comprise satisfying a function related to a reference signal. Signals satisfying an inclusion function can be included in the analog signal averaging, and signals failing to satisfy the inclusion function (or satisfying an exclusion function) can be excluded from the analog signal averaging.

Analog output circuit 600 can comprise a set of column buffer output circuits, including column buffer output circuit 602, and column buffer output circuit 604. Although FIG. 6 illustrates only two such column buffer output circuits, it should be appreciated that analog output circuit 600 can comprise additional column buffer output circuits to the left or right of output circuits 602 and 604. For instance, analog output circuit 600 can comprise a column buffer output circuit for each column buffer connected to an optical sensor (not depicted—but see FIGS. 1 and 2, infra). The following description pertains to the reference numbers and components of column buffer output circuit 604; however it should be appreciated that the description can be equally applicable to similar components of column buffer output circuit 602, or other such output circuits.

Column buffer output circuit 604 can comprise a column buffer 606 for receiving signals output by a column of an optical sensor. Column buffer 606 can transmit received signals unchanged, or can condition received signals in a predetermined manner. A readout switch 608 can be closed to facilitate output of signals provided by column buffer 606. Alternatively, or in addition, readout switch 608 can be closed to facilitate providing the signal to a sampling capacitor 618. This signal can be averaged with other signals at other sampling capacitors of analog output circuit 600, by activation of a set of T-switches 616 configured to connect sampling capacitors of analog output circuit 600 in parallel. A measurement of the average can then be sampled from readout switch 608.

In addition to the foregoing, column buffer output circuit 604 can comprise a bypass circuit comprising a comparator bypass 610 and a bypass switch 614. Comparator bypass 610 can be activated by input of a $V_{REFERENCE}$ signal 612 at a signal input of comparator bypass 610. In at least one aspect of the subject disclosure, $V_{REFERENCE}$ 612 can be input to comparator bypass 610, thereby activating comparator bypass 610, in response to an optical black pixel signal being received at column buffer output circuit 604. In an additional aspect, $V_{REFERENCE}$ 612 can be removed, thereby deactivating comparator bypass 610, in response to an active pixel signal being received at column buffer output circuit 604. Thus, in this aspect(s) of the subject disclosure, comparator bypass 610 is activated for optical black pixel signals and deactivated for active pixel signals received at column buffer output circuit 604.

When activated, comparator bypass 610 is configured to sample a signal at an output of column buffer 606 and compare the sampled signal to $V_{REFERENCE}$ 612. $V_{REFERENCE}$ 612 can be selected to have an amplitude that is typical for optical black pixel signals, representative of optical black pixel signals of a particular optical sensor, or a predetermined amplitude having a suitable relationship to optical black pixel signals. Comparator bypass 610 can further be configured to determine whether the sampled signal satisfies a function related to $V_{REFERENCE}$ 612, such as being within a predetermined range of the amplitude of $V_{REFERENCE}$ 612. In response to the sampled signal satisfying the function, readout switch 608 can be closed and bypass switch 614 opened, to transmit the voltage from column buffer 606 to sampling capacitor 618. This facilitates inclusion of the sampled signal in an analog averaging function of analog output circuit 600. Otherwise, in response to the sampled signal failing to satisfy the function, readout switch 608 can be opened and bypass switch 614 closed, to remove T-switch 616 and sampling capacitor 618 from the parallel sampling capacitor circuit employed to generate the analog signal average. In this manner, the sampled signal can be selectively included within, or removed from, the signal average, based at least in part on a characteristic of the sample signal. Said differently, the sampled signal can be included or excluded based on whether the sampled signal satisfies the function related to $V_{REFERENCE}$ 612. Thus, by controlling $V_{REFERENCE}$ 612, or by controlling the function of $V_{REFERENCE}$ 612 employed by comparator bypass 610, sampled signals can be included or excluded from the signal averaging based on a predetermined set of conditions. As an example, an optical black signal that is outside a predetermined range (e.g., +/−fifty millivolts) of a suitable reference signal amplitude (e.g., 150 millivolts) can be excluded from the analog averaging, whereas a second optical black signal that is within the predetermined range of the reference signal amplitude can be included within the analog averaging. This can be accomplished, for instance, by controlling the function to reflect the predetermined range, and setting $V_{REFERENCE}$ 612 to the suitable reference signal amplitude.

The aforementioned diagrams have been described with respect to interaction between several systems, apparatuses, components, electronic circuits, or photo-detector arrays. It should be appreciated that such diagrams can include those components or systems or components specified therein, some of the specified components, or additional components. For example, a system could include optical sensor 100 comprising readout circuit 210 and analog output circuit 300. Sub-components could also be implemented as components electrically connected to other sub-components rather than included within a parent system. Additionally, it should be noted that two or more components could be combined into a single component providing aggregate functionality. For instance, parallel/sequential circuit 214 can include controller 216 to facilitate selective averaging or conditioning of received signals, and control of such selection, by way of a single component. Components of the disclosed systems and apparatuses can also interact with one or more other components not specifically described herein but known by those of skill in the art, or made known to one of skill in the art by way of the context provided herein.

Figure 7:
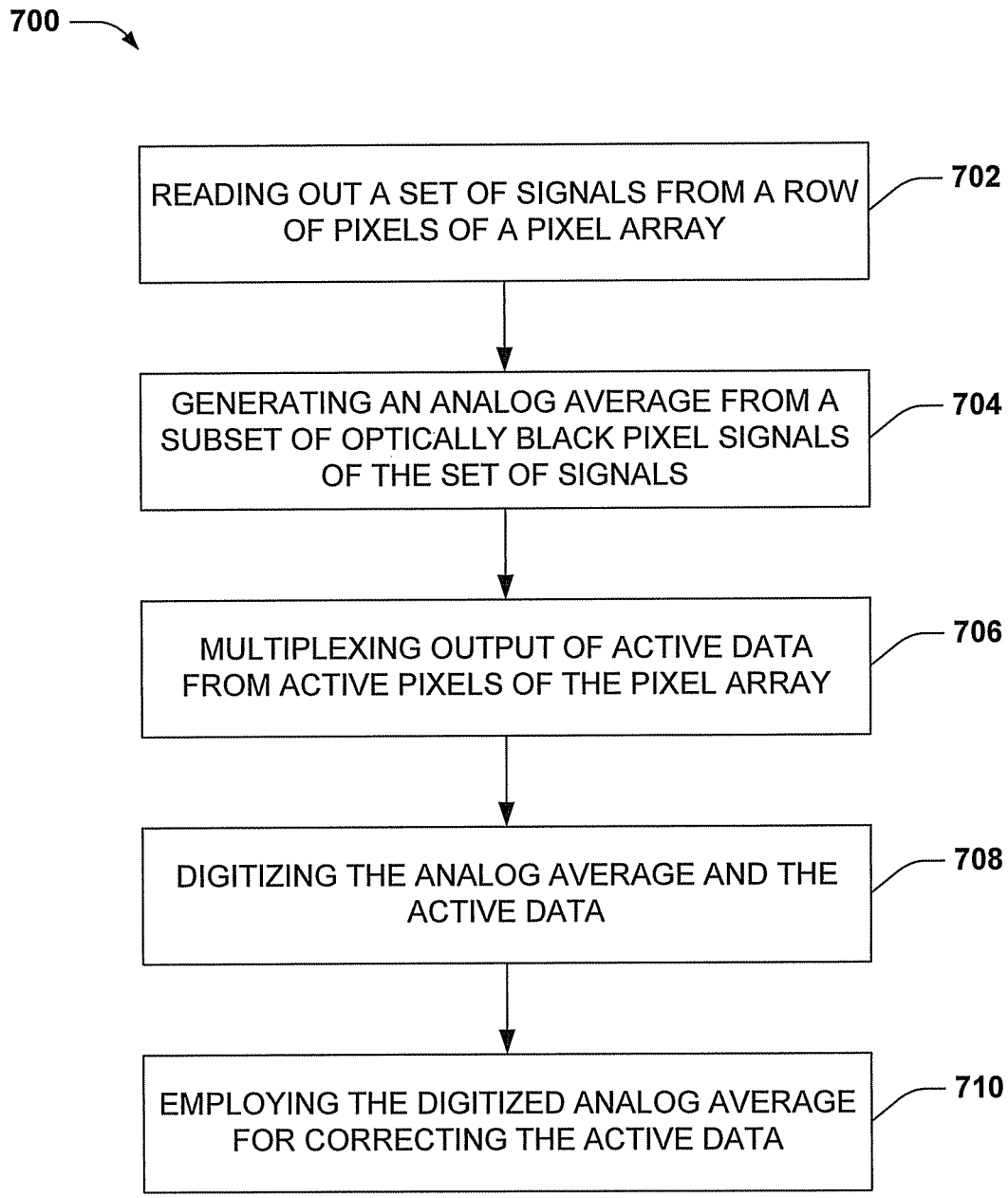
FIG. 7 depicts a flowchart of a sample method for implementing digital correction of optical sensor signals according to further aspects.
Figure 8:
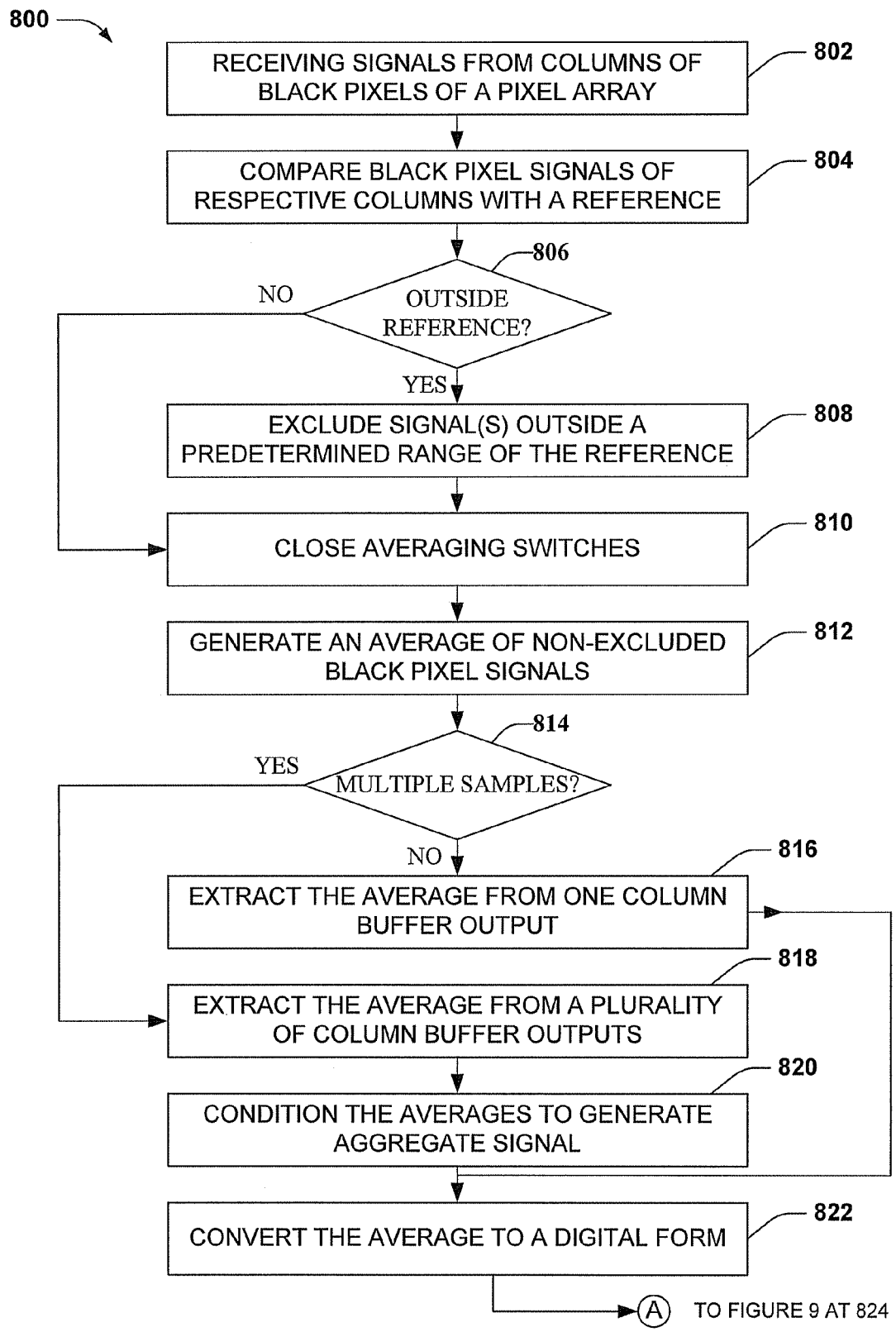
FIGS. 8 and 9 illustrate a flowchart of an example method for analog averaging of optical black signals in digital signal corrections.
Figure 9:
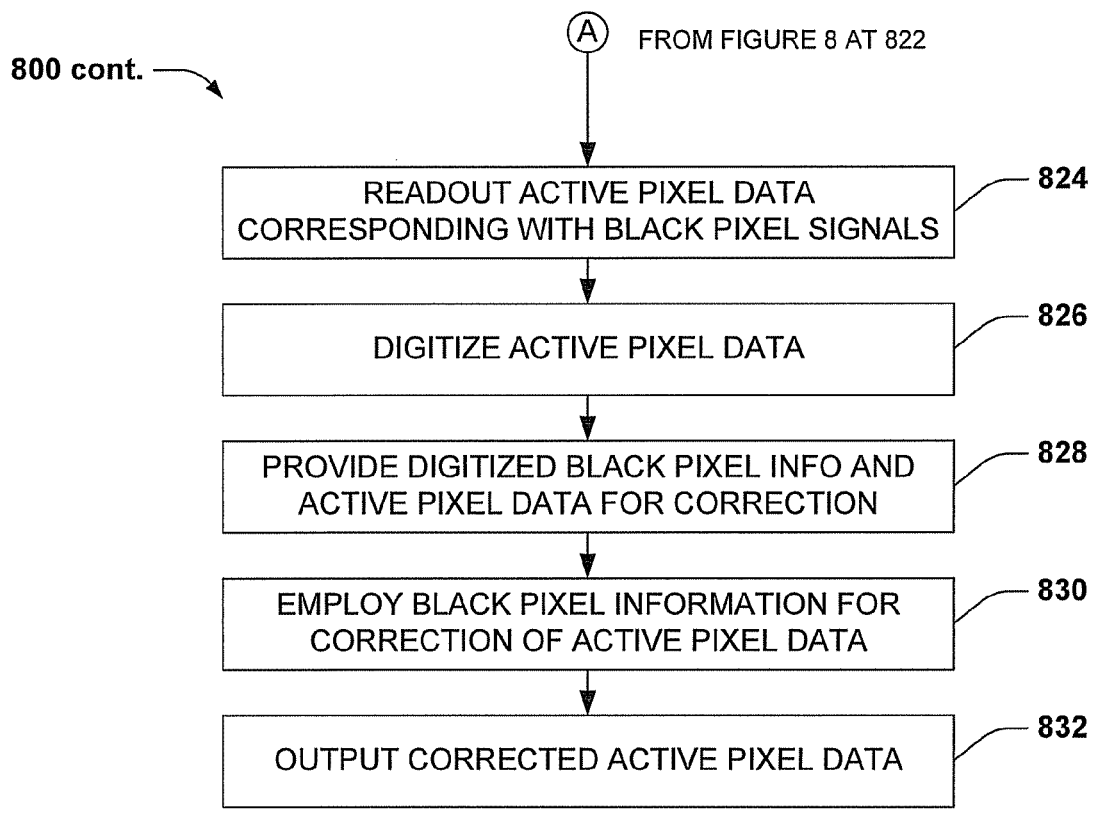

In view of the exemplary diagrams described supra, process methods that may be implemented in accordance with the disclosed subject matter will be better appreciated with reference to the flow charts of FIGS. 7-9. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter. Additionally, it should be further appreciated that the methods disclosed hereinafter and throughout this specification are capable of being stored on an article of manufacture to facilitate transporting and transferring such methods to an electronic device. The term article of manufacture, as used, is intended to encompass a computer program accessible from any computer-readable device, device in conjunction with a carrier, or storage medium.

FIG. 7 illustrates a flowchart of an example method 700 for providing data correction for optical sensors, according to one or more further aspects of the subject disclosure. At 702, method 700 can comprise reading out a set of signals from pixels of a pixel array. At 704, method 700 can comprise generating an analog average of optically black pixel signals from a subset of the set of signals. At 706, method 700 can comprise multiplexing output of active pixel data from a second subset of the set of signals received from active pixels of the pixel array. Additionally, at 708, method 700 can comprise digitizing the analog average and the active data. At 710, method 700 can comprise employing the digitized analog average for correcting the active data. Correction can include a line noise correction, a clamp algorithm, or the like, or a suitable combination thereof in various aspects of the subject disclosure. Moreover, it should be appreciated that generating the analog average can provide significant advantages over reading out optically black analog information sequentially, and performing the average in the digital domain. For instance, optical black pixel signals can be read out in parallel to generate the signal average in the analog domain, significantly reducing line read time. Moreover, the averaging is not limited to a predetermined number of signals, such as a number of signals proportional to a power-of-2. Accordingly, greater flexibility and full utilization of optical black pixel information can be achieved, providing greater efficacy and improved correction results. Furthermore, analog averaging can often be conducted with reduced silicon space, providing potential reductions in chip size. Accordingly, method 700 can provide significant advantages in data correction for optical sensors.

FIGS. 8 and 9 depict a flowchart of a sample method 800 for providing analog averaging of optical black pixel signals for improved data correction for image sensors, according to still other aspects of the subject disclosure. At 802, method 800 can comprise receiving signals from columns of optical black pixels of a pixel array. At 804, method 800 can comprise comparing the black pixel signals of respective columns to a reference voltage. At 806, a determination can be made as to whether one or more of the black pixel signals fails to satisfy a function related to the reference voltage. In one example, the function can be related to a range of voltages related to the reference voltage. If a black pixel signal(s) does fail to satisfy the function, method 800 can proceed to 808. Otherwise, method 800 proceeds at 810.

At 808, method 800 can comprise excluding optical black pixel signals that fail to satisfy the function related to the reference voltage. At 810, method 800 can comprise closing a set of averaging switches and, at 812, generating an average of non-excluded optical black pixel signals.

At 814, a determination is made as to whether multiple samples of the average are to be utilized. If multiple averages are utilized, method 800 proceeds to 818; otherwise method 800 proceeds to 816, where method 800 can comprise extracting the average from one column buffer output associated with the image sensor. From 816, method 800 can proceed to 822.

At 818, method 800 can comprise extracting respective samples of the average from a plurality of column buffer outputs associated with the image sensor. At 820, method 800 can comprise conditioning the averages to generate an aggregate signal. The aggregate signal can be an average of the respective samples, a mean of the respective samples, a mode of the respective samples, or another suitable derivation of the respective samples, or in at least one aspect, a set of values (e.g., voltages, . . . ) comprising respective values of the respective samples. At 822, method 800 can comprise converting the average(s) or aggregate signal to digital form. Method 800 can proceed at 824 of FIG. 9.

Referring now to FIG. 9, method 800 can comprise, at 824, reading out active pixel data from the image sensor corresponding with the black pixel signals (e.g., within a same row as the columns of optical black pixels). At 826, method 800 can comprise digitizing the active pixel data. At 828, method 800 can comprise providing digitized black pixel information and active pixel data for correction. At 830, method 800 can comprise employing black pixel information (e.g., an average of the black pixel signals) for correction of the active pixel data. At 832, method 800 can comprise outputting corrected active pixel data.

Figure 10:
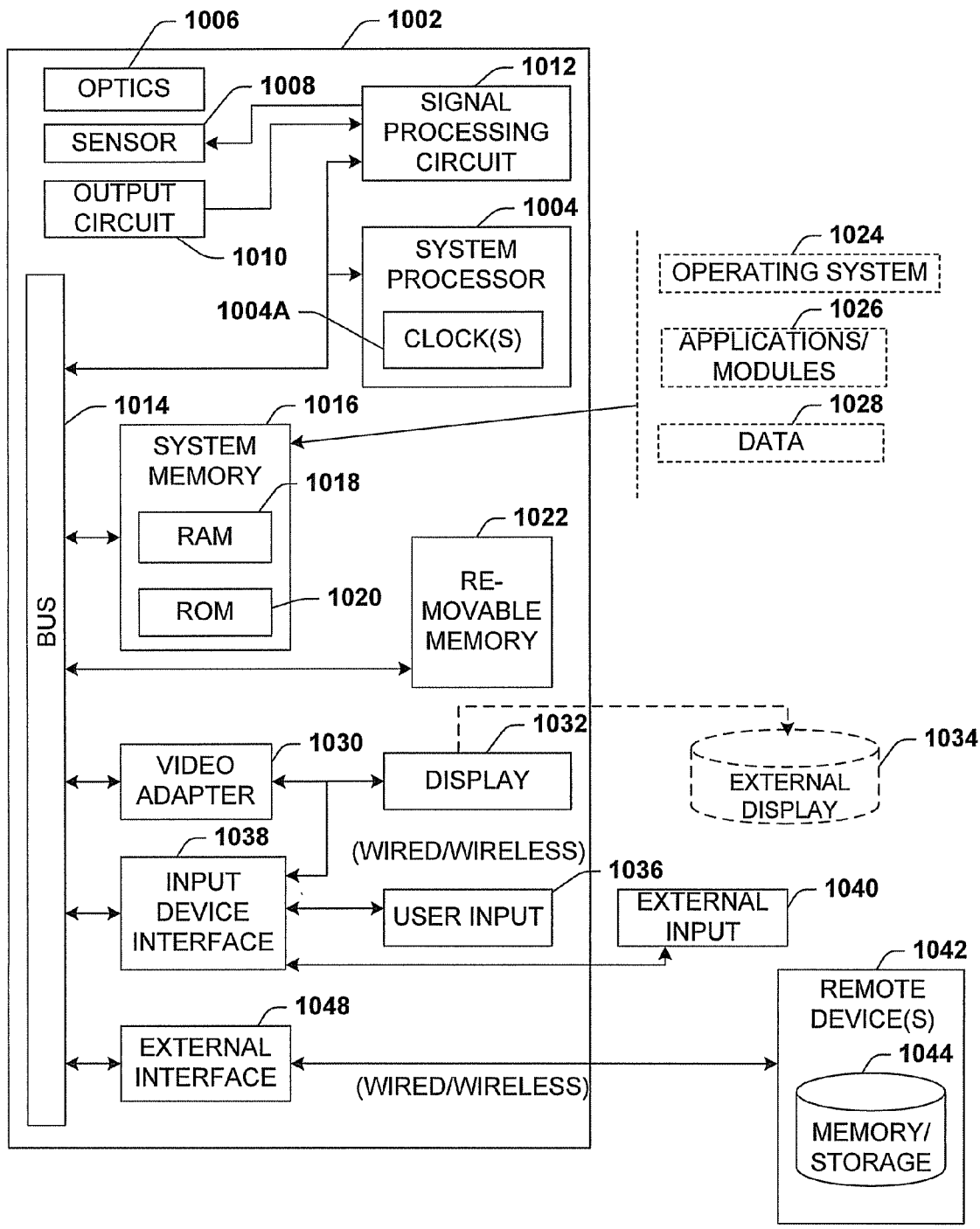
FIG. 10 depicts a block diagram of an example electronic processing environment for implementing one or more disclosed aspects.

Referring now to FIG. 10, there is illustrated a block diagram of an exemplary digital camera system operable to execute one or more aspects of the disclosed architecture. In order to provide additional context for various aspects of the disclosed embodiments, FIG. 10 and the following discussion are intended to provide a brief, general description of a suitable electronic computing environment 1000 in which the various aspects of the disclosed embodiments can be implemented. Additionally, while the disclosed embodiments described above may be suitable for application in the general context of instructions that may run or be executed in conjunction with an electronic device, those skilled in the art will recognize that the disclosed embodiments also can be implemented in combination with other program modules and/or as a combination of hardware and software.

Generally, program modules include routines, programs, components, data structures, etc., that perform particular tasks associated with electronic computing environment 1000. Moreover, those skilled in the art will appreciate that the disclosed methods can be practiced with other electronic system configurations, including hand-held computing devices, microprocessor-based or programmable consumer electronics, single-processor or multiprocessor state machines, minicomputers, as well as personal computers, and the like, each of which can be operatively or communicatively coupled to one or more associated devices.

The illustrated aspects of the various embodiments can also be practiced in distributed computing environments where certain tasks are performed by remote processing devices that are linked through a wired or wireless communications network. In a distributed computing environment, program modules can be located in both local and remote memory storage devices.

An electronic processing device typically includes a variety of computer-readable media. Computer-readable media can be any available media that can be accessed by an electronic processing device and includes both volatile and nonvolatile media, removable and non-removable media. By way of example, and not limitation, computer-readable media can comprise non-transitory computer media (e.g., computer storage media, . . . ) and transitory communication media (e.g., signals, . . . ). Non-transitory computer media can include volatile and nonvolatile, removable and non-removable media implemented in any suitable method or technology for storage of information such as computer-readable instructions, data structures, program modules or other data. Non-transitory computer media includes, but is not limited to, RAM, ROM, EEPROM, flash memory or other memory technology, or any other medium which can be used to store information and which can be accessed by an electronic processing device.

Continuing to reference FIG. 10, the exemplary electronic processing environment 1000 for implementing various aspects of one or more of the disclosed embodiments includes a digital camera 1002, the digital camera 1002 including a system processor 1004, optics 1006, an image sensor 1008, an output circuit 1010, a signal processing circuit 1012, a system memory 1016 and a system bus 1014. The system bus 1014 couples to system components including, but not limited to, the system memory 1016 to the system processor 1004. The system processor 1004 can be a suitable semiconductor processing device manufactured for digital camera 1002, or any of various commercially available processors. Dual microprocessors and other multi-processor architectures may also be employed as the system processor 1004.

Optics 1006 can comprise one or more lens elements comprised of refractive material, reflecting material, scattering material or absorbing material, or a suitable combination thereof. The refractive material can be suitable to refract electromagnetic radiation, particularly in the visible spectrum, but also the near infrared or ultraviolet spectra, or other suitable spectra. Particularly, optics 1006 can be configured to project and focus an image of an object onto image sensor 1008. Optics can also be configured with an actuator (not depicted) to mechanically adjust optics 1006 to focus objects at varying distances from digital camera 1002.

Image sensor 1008 can comprise any of various sensors for receiving electromagnetic radiation and generating electric signals proportionate to a magnitude(s) of the electromagnetic radiation. For instance, image sensor 1008 can comprise a video tube, a charge-coupled device, or a CMOS device, or the like, or an array of such devices. In a particular example, image sensor 1008 can comprise an array of photo-detectors as described herein (e.g., active pixel region 104 and optically black pixel region 106). Electric signals generated by image sensor 1008 can be transferred to output circuit 1010, in response to a clock signal generated by an electronic clock(s) 1004A managed by system processor 1004. The electric signals can then be output to signal processing circuit 1012 for image processing.

Signal processing circuit 1012 can be any suitable hardware or software processing entity, including an integrated circuit(s), an application specific integrated circuit(s) (ASIC), a state machine, or other suitable signal processing device. Signal processing circuit 1012 can be configured to perform operations on electric signals provided by output circuit 1010. These operations can include correlated double sampling, gamma processing, analog to digital conversion, digital to analog conversion, gain adjustment, interpolation, compression, or a combination thereof or of the like, to generate digital data to be adapted for presentation on an electronic display 1032 of digital camera 1002. Additionally, signal processing circuit 1012 can store the digital data in system memory 1016 before, during and after the operations.

The system bus 1014 can be any of several types of bus structure suitable for communicatively connecting components of digital camera 1002. System bus 1014 can further interconnect to a memory bus (with or without a memory controller), a peripheral bus, and a local bus using any of a variety of commercially available bus architectures. The system memory 1016 can include read-only memory (ROM) 1020 or random access memory (RAM) 1018. A basic input/output system (BIOS) for digital camera 1002 can be stored in a non-volatile memory 1020 such as ROM, EPROM, EEPROM, . . . , which BIOS contains the basic routines that help to transfer information between elements within the digital camera 1002, when powered on for instance. The RAM 1018 can also include a high-speed RAM such as static RAM, resistive RAM, or others, for caching data. Furthermore, digital camera can include removable memory 1022, which can include any suitable non-volatile memory (e.g., Flash memory), or other removable memory technology.

A number of program modules can be stored in the system memory 1016, including an operating system 1024, one or more application programs or program modules 1026 and program data 1028. All or portions of the operating system, applications, modules, and/or data can also be cached in the RAM 1018 It is appreciated that the various embodiments can be implemented with various commercially available or proprietary operating systems or combinations of operating systems.

A display 1032 is also connected to the system bus 1014 via an interface, such as a video adapter 1030. Display 1032 can comprise a flat panel display, such as a liquid crystal display, a light-emitting diode display, or the like. System processor 1004 can control output of image data to present a digital replica of the image received by image sensor 1008 on display 1032. In addition, digital camera 1002 can output the image data to an external display 1034 via a suitable external interface 1048.

A user can enter commands and information into the digital camera 1002 through one or more input devices, e.g., touch screen manipulation, buttons, switches, dials, levers, etc. For instance, zoom functionality is often implemented by pressing a button, dial, lever, etc., in one direction to zoom in, or another direction to zoom out. Further, display options, selection of images, and similar display commands can be input via a touch screen, often implemented as part of display 1032. Other input devices (not shown) may include a microphone, an IR remote control, a joystick, a game pad, a stylus pen, or the like. These and other input devices are often connected to the system processor 1004 through an input device interface 1038 that is coupled to the system bus 1014, but can be connected by other interfaces, such as a parallel port, an IEEE1394 serial port, a game port, a USB port, an IR interface, a Bluetooth interface, etc.

The external interface 1048 can include at least one or both of Universal Serial Bus (USB) and IEEE1394 interface technologies. Other external connection technologies are within contemplation of the subject matter disclosed herein. Moreover, external interface 1048 can include a wireless technology, such as a Wi-Fi communication technology, Bluetooth™ technology, infrared (IR) technology, near field communication (NFC) technology, cellular technology, or the like. In addition to an external display, external interface 1048 can facilitate communicatively coupling digital camera 1002 to one or more remote devices 1042. Remote device(s) 1042 can include a computer, a display, a memory or storage device 1044, and so on. Moreover, commands can be given to digital camera 1002 from remote device(s) 1042 over external interface 1048 to system processor 1004. This can facilitate remote control of digital camera 1002, for remote camera operation (e.g., taking pictures, adding or deleting pictures from system memory 1016, etc.), transferring data, such as stored digital images, updating operation system 1024, applications/program modules 1026, or data 1028, and so on.

The digital camera 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth wireless technologies. Thus, the communication can be a predefined structure as with a conventional network or simply an ad hoc communication between at least two devices.

Wi-Fi allows connection to the Internet from various locations within range of a Wi-Fi access point, without wires. Wi-Fi is a wireless technology similar to that used in a cell phone that enables such devices, e.g., computers, to send and receive data indoors and out; within the range of the access point. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, as well as other rates (e.g., 802.11g, 802.11n, . . . ) or with products that contain both bands (dual band), so the networks can provide real-world performance similar to the basic 10BaseT wired Ethernet networks used in many offices.

What has been described above includes examples of the disclosed embodiments. It is, of course, not possible to describe every conceivable combination of components or methods for purposes of describing the embodiments, but one of ordinary skill in the art may recognize that many further combinations and permutations are possible. Accordingly, the detailed description is intended to embrace all such alterations, modifications, and variations that fall within the spirit and scope of the subject disclosure, including such alterations, modifications and variations that might be intuited by one of ordinary skill in the art by way of the context presented herein.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts or events of the various methods.

As used in this application and the appended claims, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. An optical sensor, comprising:
an optical pixel array comprising rows and columns of optical pixels, a subset of the columns of optical pixels comprising respective pluralities of optically black pixels;
a readout circuit for extracting information from the optical pixel array, the readout circuit extracts signals from a set of optically black pixels of the subset of the columns of optical pixels, and generates an analog average of the signals; wherein:
the readout circuit outputs the analog average to a digital circuit configured to employ the analog average for a digital data correction of optical pixel array data.

2. The optical sensor of claim 1, wherein the digital circuit comprises a correction circuit that digitizes the analog average of the pixel signals in conjunction with implementing a data correction for active pixel data extracted from the subset of the columns of pixels.

3. The optical sensor of claim 1, wherein the readout circuit comprises a set of column buffers for extracting the information from respective ones of the columns of optical pixels, and further wherein a substantially similar value of the analog average is available for output at a plurality of the set of column buffers.

4. The optical sensor of claim 3, wherein the readout circuit is configured to extract the analog average from a subset of the set of column buffers that is less than the entire set of the column buffers.

5. The optical sensor of claim 3, wherein respective ones of the set of optically black pixels are located within respective ones of the subset of the columns of optical pixels.

6. The optical sensor of claim 3, wherein the column buffers are connected to respective sampling capacitors at respective outputs of the column buffers.

7. The optical sensor of claim 6, further comprising a set of switches configured to electrically connect or electrically isolate respective subsets of the sampling capacitors.

8. The optical sensor of claim 7, wherein the set of switches comprise T switches.

9. The optical sensor of claim 7, wherein a subset of the set of switches are configured to generate an average of a subset of the signals from the set of optically black pixels by electrically connecting the sampling capacitors.

10. The optical sensor of claim 7, wherein the set of switches is configured to electrically connect the sampling capacitors in parallel to generate an analog average of the signals.

11. The optical sensor of claim 7, wherein the set of switches is configured to electrically isolate the sampling capacitors to facilitate the readout circuit extracting respective signals from active pixels of the optical pixel array.

12. The optical sensor of claim 1, further comprising a comparator that compares one of the extracted signals from one of the set of optically black pixels to a low-power reference signal.

13. The optical sensor of claim 12, further comprising a bypass switch configured to:
remove the one of the extracted signals from the analog average of the signals in response to a value of the one of the extracted signals satisfying a rejection function related to the low-power reference signal; and
include the one of the extracted signals within the analog average of the signals in response to the value of the one of the extracted signals satisfying an acceptance function related to the low-power reference signal.

14. A method of reading data from an optical sensor, comprising:
- reading out a set of signals from pixels of a pixel array;
- generating an analog average of optically black pixel signals from a subset of the set of signals;
- multiplexing output of active pixel data from a second subset of the set of signals received from active pixels of the pixel array;
- digitizing the analog average and the active data; and
- employing the digitized analog average for correcting the active data.

15. The method of claim 14, further comprising comparing the optically black pixel signals to a zero reference signal, and identifying whether one or more of the optically black pixel signals is outside a predetermined range of the zero reference signal.

16. The method of claim 15, further comprising excluding from the subset of the set of signals one or more of the optically black pixel signals identified to be outside the predetermined range.

17. The method of claim 14, wherein generating the analog average from the subset of the set of signals further comprises activating a set of switches for establishing a parallel electrical connection between column buffer output capacitors.

18. The method of claim 17, further comprising outputting a value of the analog average from a subset of the column buffer output capacitors for the digitizing the analog average.

19. An apparatus that provides line correction for image information generated by an optical sensor, comprising:
- a data readout circuit comprising column buffers connected to respective column output lines of an optical pixel array, and respective sampling capacitors connected to respective column buffers;
- a set of switches configurable to electrically connect or electrically isolate a variable subset of the respective sampling capacitors;
- an analog to digital converter; and
- a digital correction circuit, wherein:
  the set of switches are configured to electrically connect a selected subset of the respective sampling capacitors to generate an analog average of signals output by optically black pixels of the optical pixel array, further wherein the set of switches are configured to electrically isolate the respective sampling capacitors in response to the data readout circuit receiving optical image signals output by active pixels of the optical pixel array, the analog to digital converter digitizes the analog average and the optical image signals, and the digital correction circuit utilizes the digitized analog average for correcting the digitized optical image signals.

20. The apparatus of claim 19, further comprising:
- a set of comparators connected to respective column buffers that compare respective ones of the signals output by optically black pixels to a reference signal; and
- a set of bypass circuits configured to exclude respective ones of the signals from the generated analog average that are determined by one or more of the set of comparators to satisfy a rejection function with respect to the reference signal.

\* \* \* \* \*